United States Patent
Carney et al.

(10) Patent No.: US 6,408,278 B1
(45) Date of Patent: Jun. 18, 2002

(54) SYSTEM AND METHOD FOR DELIVERING OUT-OF-HOME PROGRAMMING

(75) Inventors: Patrick J. Carney, Wallingford; Joel B. Pina, West Chester; James J. Boyle, Havertown; Corey A. Perine, Philadelphia, all of PA (US)

(73) Assignee: I-Open.com, LLC, Eddystone, PA (US)

( * ) Notice: Subject to any disclaimer, the term of this patent is extended or adjusted under 35 U.S.C. 154(b) by 0 days.

(21) Appl. No.: 09/437,373

(22) Filed: Nov. 10, 1999

Related U.S. Application Data
(60) Provisional application No. 60/107,735, filed on Nov. 10, 1998.

(51) Int. Cl.[7] .............................................. G06F 17/60
(52) U.S. Cl. ........................................................ 705/14
(58) Field of Search ............................................ 705/14

(56) References Cited

U.S. PATENT DOCUMENTS

| | | | | |
|---|---|---|---|---|
| RE32,115 E | * | 4/1986 | Lockwood et al. | 235/381 |
| 5,133,081 A | * | 7/1992 | Mayo | 455/18 |
| 5,309,355 A | * | 5/1994 | Lockwood | 705/6 |
| 5,539,810 A | * | 7/1996 | Kennedy, III et al. | 379/88.25 |
| 5,612,741 A | * | 3/1997 | Loban et al. | 348/383 |
| 5,737,533 A | | 4/1998 | de Hond | 395/200.49 |

FOREIGN PATENT DOCUMENTS

JP  08194447 A  * 7/1996

OTHER PUBLICATIONS

"KioskS offer instant interactive information", Hotel & Motel Management, v. 211 No. 8 (May 6, 1996), p. 56+.*
Sterne, Jim, "What makes people click: advertising on the web" (Indianapolis IN: Que Corp., 1997: 135–138.*

* cited by examiner

Primary Examiner—Stephen Gravini
Assistant Examiner—Donald L. Champagne
(74) Attorney, Agent, or Firm—Woodcock Washburn LLP (57) ABSTRACT

A system and method through which programming content is delivered for display on a network of electronic out-of-home display devices. The network includes a plurality of individually addressable display devices that are located in public venues. Demographic data is tracked for the display devices by place and by time so that the programming content can more closely conform to the changing demographic.

36 Claims, 9 Drawing Sheets

SYSTEM AND METHOD FOR DELIVERING OUT-OF-HOME PROGRAMMING

This application claims the benefit of U.S. Provisional Application No. 60/107,735 filed Nov. 10, 1998.

TECHNICAL FIELD

The present invention relates generally to systems for delivering out-of-home programming information, and more particularly to a network based system for demographically targeted programming delivery to public display devices.

BACKGROUND OF THE INVENTION

Each year, companies in the U.S. spend billions of dollars on Television, Print, Radio and Outdoor advertising delivering their message to consumers. These traditional channels, while effective, often require large up-front financial commitments, demand lead times of weeks or months, and deliver a static message that is very expensive and time consuming to modify once produced.

In-home Internet users generally have an Internet account or an account with an Internet e-commerce service, such as Amazon.com and others. As a result, advertisers can gather information about a particular user as a by-product of the account process and can target advertising and other programming accordingly. However, when the audience is more diverse and receiving the programming and advertising in a less direct fashion, it is more challenging to determine the demographics of the viewer. For example, in traditional out-of-home advertising, such as billboards or dioramas, little demographic information is available; moreover, the information itself is not dynamically tracked nor can the advertising change quickly to reflect changes in the demographic of the viewers.

Thus, in view of the foregoing, there is a need for an improved system and method for delivering out-of-home programming that overcomes the drawbacks of the prior art.

SUMMARY OF THE INVENTION

Briefly, the present invention is directed toward a programming distribution network, comprising a plurality of geographically dispersed display devices that are situated in public places. The display devices are connected to a server computer by way of a communications network so that the server computer is programmable to select a specific one of the plurality of geographically dispersed display devices and deliver thereto programming, such as advertising, for display on that display device.

According to an aspect of the invention, the system can be used to identify and display from a prescribed set of programming material a subset of the programming material for display at each of the display devices so that different display devices display different programming at any given time and the programming material displayed on each display device is dynamically updateable. Particular display devices are identified on the basis of a target audience for each set of programming material. Moreover, each display device is at a known location, and further has associated demographic information based on that device's location. The demographic information associated with each display device may change independently based on predicted changes in the target audience as a function of time.

According to a further aspect of the invention, the network of display devices can be coupled to an inventory supply system that tracks inventory for a product or service. As a result, the network can change the programming on selected display devices as a function of inventory levels. Accordingly, when an inventory system indicates inventory above a predefined level at a particular location, programming can be display on selected display devices that is indicative of the product.

According to another aspect of the invention, a data-gathering device is co-located with at least selected ones of the display devices. The data gathering devices collect information indicative of a demographic of an audience of a display device.

BRIEF DESCRIPTION OF THE DRAWINGS

Other features of the invention are further apparent from the following. detailed description of presently preferred exemplary embodiments of the invention taken in conjunction with the accompanying drawings, of which.

DETAILED DESCRIPTION OF THE INVENTION

OVERVIEW

The present invention provides a system for delivering programming content, such as still frame and full motion advertising, to a plurality of out-of-home, electronic display devices. The system provides a mechanism whereby demographic information is collected from various sources to develop a demographic, time-dependent profile for a particular out-of home display device wherein the demographic profile may change as a function of time of day, time of week, and so on. As a result, the programming content displayed on the out-of-home display device can be changed in conformance with the changes in the demographic profile to more effectively target the intended consumers of the programming content.

EXAMPLE OPERATING ENVIRONMENT

Figure 1:
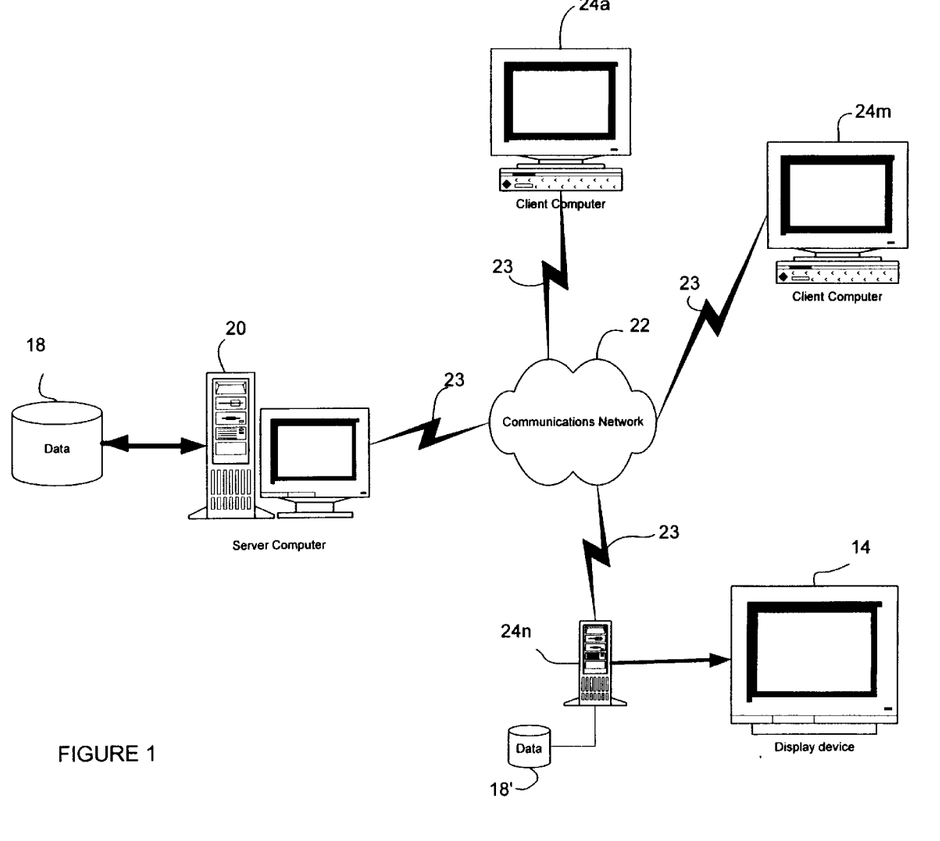
FIG. 1 is a block diagram representing a computer network system in which aspects of the present invention may be incorporated.

FIG. 1 illustrates an exemplary network environment in which the present invention may be employed. Of course, actual network environments can be arranged in a variety of configurations; however, the example environment shown here provides a framework for understanding the type of environment in which the present invention operates.

The network comprises a communications network 22 that may comprise, for example, a cable network, a wide area network (WAN), local area network (LAN), the Internet; an Intranet, a combination of the above, or the like. Data is transmitted and received over the network via a carrier such as cable, fiber optic lines, telephone lines, wireless connections, and so on. The network environment further includes client computers, e.g., computer 24*a*, that are connected to server computers, e.g., server computer 20, by way of communications network 22. Client computers 24*a*–24*m*, 25 and server computer 20 are connected to the communications network by way of communication interfaces 23. The communication interfaces 23 depicted in FIG. 1 may also include a LAN or a WAN. Such networking environments are commonplace in enterprise-wide computer networks, Intranets and the Internet.

When used in a LAN networking environment, the client computers 24*a*–24*m*, 25 are connected to the local network environment through a network interface or adapter. When used in a WAN networking environment, the client computer 24*a*–24*m*, 25 may include a modem or other apparatus for establishing communications over the wide area network. It will be appreciated that the communication interfaces 23 described are only examples and as such other mechanisms for establishing a communications link between computers 20, and 24a-24m, 25 and communications network 22 may be used.

Server computer 20*b* provides management of software services that are accessible to client computers 24*a*–24*m*, 25 via communications network 22. The software services provided may be, for example, accessible by way of Internet Protocol by addressing the server computer via a Universal Resources Locator (URL). For example, if server computer 20 were located at www.i-open.com, then client computers 24*a*–24*m*, 25 would be accessible using a conventional browser, such as Microsoft Explorer, at the URL: http://www.i-open.com. Moreover, although server computer 20 is depicted as a single computer, it should be appreciated that such a depiction is for illustrative purposes only. An actual implementation may consist of many servers either co-located or geographically dispersed such as by distributing the functions, using mirror sites, and so on.

As part of its function as a server, server computer 20 may provide access to or maintain information. Typically, server computers maintain information in databases, such as database 18, by way of database server system software. In one embodiment, server computer 20 runs Microsoft Windows NT 4.0 operating system and Microsoft SQL Server 7.0 database management software.

In the example of FIG. 1, server computer 20 provides services relating to displaying programming content on display devices, such as display device 14. As such, clients, desiring to display programming on such display devices, e.g., display device 14, access server computer 20. Clients access server 20 over communications network 22 by way of client computers 24*a*–24*n* to access computing services, upload programming content, and so on. Server computer 20, then accepts the programming content to be displayed, or provides services to generate programming content, and communicates the programming content to client computer 25, which in turn renders the programming content on display device 14. The programming content can be sent as MPEG packets, HTML pages, XML, AVI video, FLASH video, and other protocols for distributing content over a communications network.

Server 20 could also employ NetGravity's AdServer, a product designed specifically for managing the delivery of ads, as well as the collection of data. The integration of its GeoTargeting service allows for the targeting of ads to geographical regions by accessing a Worldwide Geographic Database of IP addresses. The criteria for targeting can be customized to any degree. AdServer provides administration tools that allow "targeting groups" to be created and managed from a central location. These features minimize costs and allow for infinite customizing of ad delivery. The entire AdServer platform can be integrated through the use of its open API.

According to an aspect of the invention, a database 18' is associated with display device 14 (as shown connected to computer 25). As is described in further detail below, database 18' maintains information about aspects of display device 14, such as the demographics about the probable viewing audience for a particular time period. Database 18' is shown as coupled to computer 25 to illustrate that database 18' relates to display device 14. The actual implementation could maintain the information about display device 14 within database 18', database 18, an external database maintained by another system, a combination of all three, or some similar configuration, so long as the data is accessible by server computer 20.

Virtual Private Networks ("VPNs") could be used to inter-connect client computers 24*a*–24*m*, 25 and the server computer 20. VPNs use the Internet and encryption software to establish virtual connections without the higher costs of dedicated lines. A VPN could be used for some or all of the client computers 24*a*–24*m*, 25. As such, each computer 24*a*–24*m* would establish a dedicated connection to the nearest Internet Service Provider ("ISP"). The data transmission methods could include analog modems, ISDN (Integrated Services Digital Network), ADSL (Asymmetric Digital Subscriber Line), cable, satellite, and so on.

Requirements of a WAN distributed nationally include network management tools and agents. HP Openview, Tivoili NetView, and Microsoft System Management Server (SMS) each provide enterprise wide management and monitoring capabilities. These products are built upon the Simple Network Management Protocol (SNMP) and allow remote management and proactive monitoring of all network devices utilizing SNMP tools such as RMON II. This multi-level monitoring can be combined with paging software for notification, remote control software and remote power controllers. Additionally SMS provides the capability to distribute software to remote devices for remote upgrades and installations.

The security of the WAN relies upon the VPN implementation and firewall protection. The data transferred over a VPN is encrypted with the use of 40-bit or 128-bit private/public key encryption. The 128-bit key satisfies United States Federal Government C-2 security standards. With the traffic that flows over the Internet protected, a firewall at selected location in the network (e.g., between server computer 20 and network 22 or client computer 25 and communications network 22) protect each location from Internet threats. The term firewall defines a broad range of devices. The simplest form of a firewall is a router configured for packet filtering. A router is a device that connects two, or more, networks. Axanet's Raptor or Cisco's PIX could be used to provide firewall protection. By filtering, the router prohibits specified packets (packets are data "messages") from being transferred from one network to the other. Additional protection can be had in the form of a Proxy server. Proxy servers proxy Internet addresses from a private network to the Internet, in this way hiding the private network's internal addresses. They can also be configured for packet filtering or combined with a router that packet filters. For maximum protection, off the shelf products are offered that include; packet filtering, proxy services (also called Network Address Translation), inspection and application level packet filtering. It should be noted that as well as providing security from Internet threats, each of these devices allows for management of Internet access from the private network.

NETWORK OF OUT-OF-HOME DISPLAY DEVICES

An important aspect of display device 14 is that it is an out-of-home electronic display device. As such, it is most likely located in a public venue such as a shopping center, public park, stadium, airport, rail transit station, bus station or other transit center, amusement park or other entertainment venue, convention center, and any other high traffic public place. Display device 14 is preferably a large viewing area device that is capable of displaying full motion video, static images, animated images, and text. For example, the display device could comprise a plasma display device such as NEC PlasmaSync, a video wall of monitors, an electronic billboard, and so on.

Figure 2:
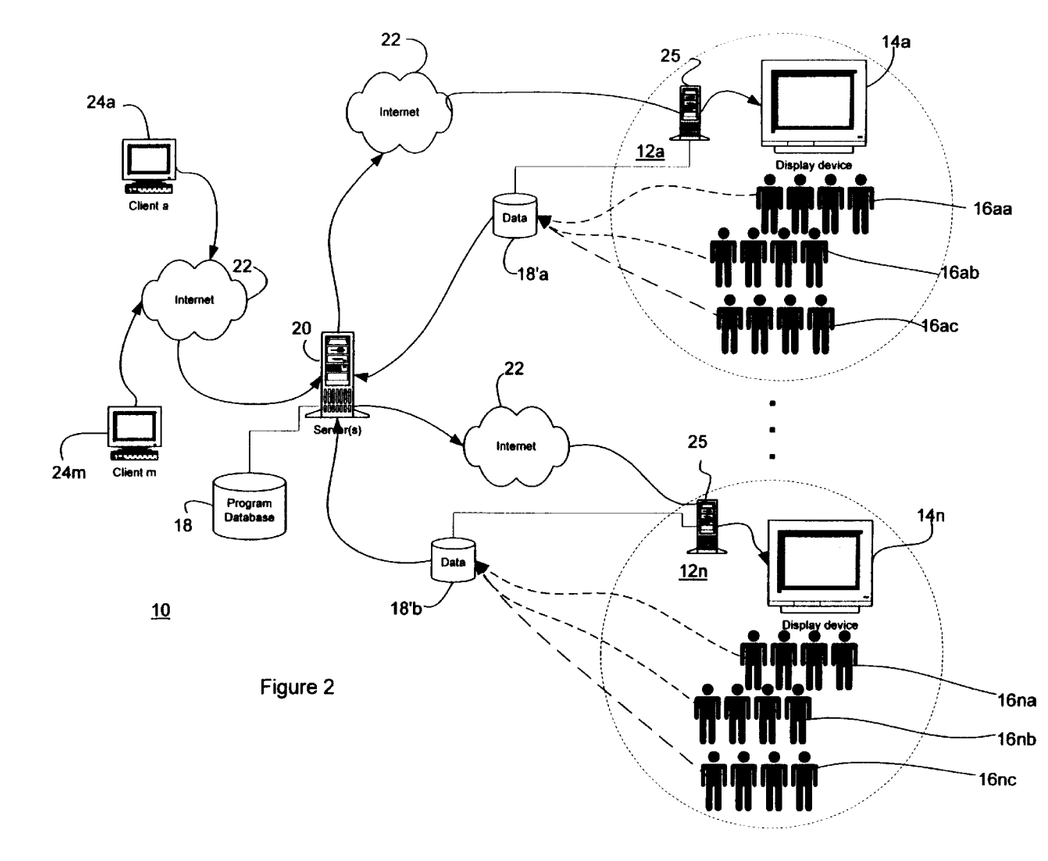
FIG. 2 is schematic diagram representing an exemplary Internet-based network in which aspects of the present invention may be incorporated.

FIG. 2, further illustrates aspects of the present invention. In the embodiment of FIG. 2, a plurality of display devices 14a–14n are located at geographically dispersed out-of-home locations 12a–12n. The geographically dispersed display devices 14a–14n are accessible from server 20 by way of an Internet connection 22. As such, server 20 can selectively point cast programming content out to display devices 14a–14n. In other words, at any given time, server 20 can control the programming content addressed to display device 14a, while separately controlling the programming content addressed to display device 14n. In the embodiment shown, display devices 14a, 14n are in communication with server computer 20 by way of Internet based connections.

Each display device is displayed in an out-of-home location and as such is viewable by an audience that may demographically vary as a function of time. For example, out-of-home display device 14a is located in venue 12a and is viewable by audience 16aa having a first demographic (e.g., males in the age range of 15–19) s audience 16ab having a second demographic (e.g., females in the age range of 35–45), and audience 16ac having a third demographic (e.g., families). The demographic for each audience may change over time throughout a given day, throughout a given week, throughout a given month, and so on. For example, early afternoon traffic at a mall may comprise a large population of school aged children while evenings and weekends may comprise complete families.

According to an aspect of the invention, database 18'a maintains information indicative of the demographic changes associated with a given display device by, for example collecting and maintaining historical demographic information. The demographic information is then accessible to server computer 20 so that the programming content for a given display device can be adjusted to conform with the probable demographic of the changing viewer composition.

Clients, e.g., clients a–m can access server computer 20 via computers 24a–24m, respectively, to place programming content on selected display devices 14a–14n that closely match the demographic of likely consumers of the content of their programming. For example, an advertisement targeted at a young male audience can be displayed on selected display devices, 14a–14n, only at a time and day when the audience (16aa, 16ab, 16ac–16na, 16nb, 16nc) contains a desired demographic mix (i.e. a sufficient number of young males so that the advertisement is likely to generate interest in the viewing audience). Similarly, display devices 14a–14n not having a sufficient audience of young males at a given time can be avoided.

TRANSIT CENTER EMBODIMENT

Figure 3:
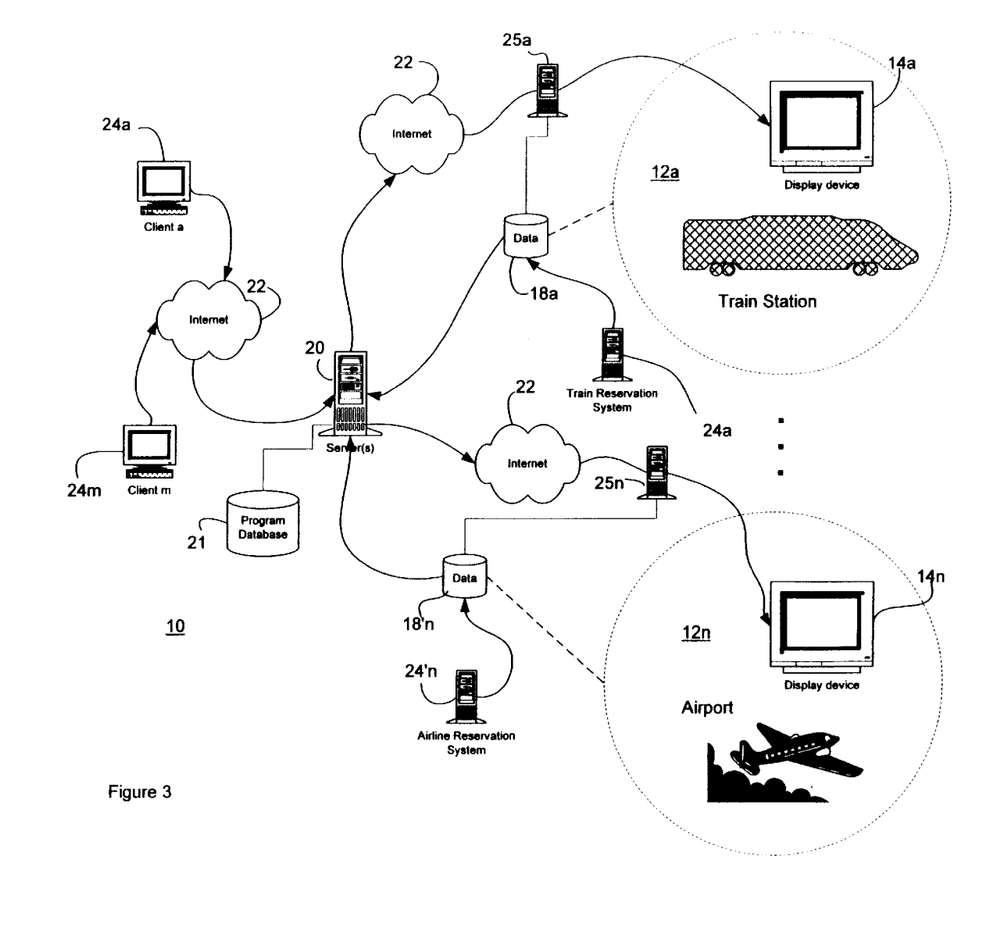
FIG. 3 is a schematic diagram representing an one embodiment of the invention as applied to public displays in transportation centers.

FIG. 3 further illustrates an aspect of the present invention. Here, the display devices are located in transit centers, e.g., train stations, airports, and the like. Database 18'a–18'n may receive demographic information from a reservation system, such as the SABRE reservation system.

Further, granularity of the information available from the reservation system, may contain data down to the gate level. For example, for a given gate the reservation system 24a, 24n, may provide demographic information for a given time of day, e.g., in conjunction with a flight departure or arrival. Additionally, the reservation system may provide information regarding the destination or point of departure of the viewing audience. Such additional destination and departure information can be used to further refine the content of the programming presented at a given time on a particular display device. For example, a display device proximate an airline gate may display Disney World information during a time proximate a flight to Orlando, Fla. and may display information about the Statue of Liberty during a time proximate a flight to New York City, N.Y.

As is described more fully below, the application of the present invention to a transit system provides additional flexibility to the network of out-of-home display devices. For example, a product distributor may have product inventory in a particular location and would like to effectively advertise the product availability at a particular destination. In such a case, by providing the ability to target an audience having a particular destination, the system of the present invention may provide a cost-effective mechanism to advertise a product in locations outside of the geographic market for the particular product.

GATHERING DEMOGRAPHIC DATA AND PROVIDING RAPID FEEDBACK

Figure 4:
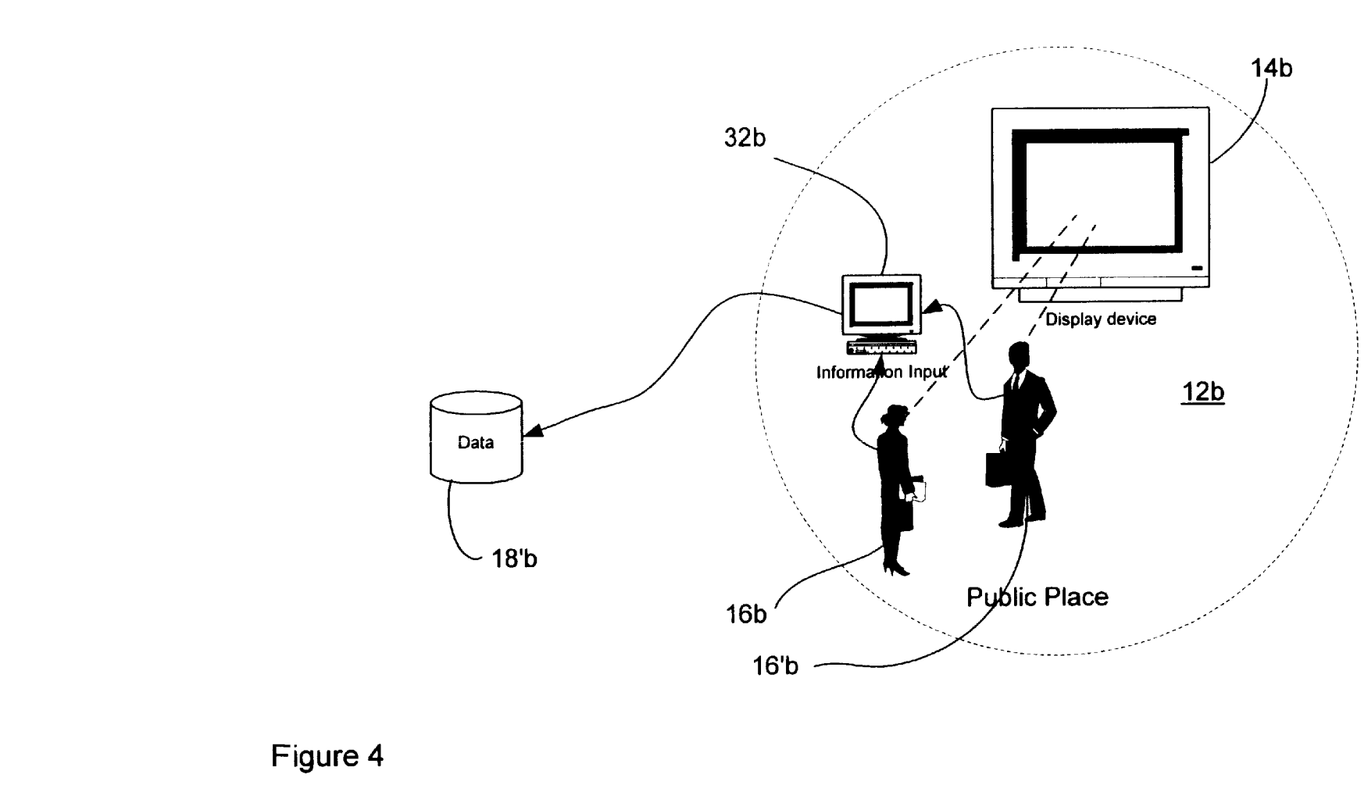
FIG. 4 is a schematic diagram of a embodiment of the invention wherein demographic data is collected proximate a public display device.

FIG. 4 illustrates aspects of gathering demographic data in accordance with another aspect of the invention. Here, a display device 14b is located in a public venue 12b. Individual viewers 16'a and 16'b are in the vicinity of display device 14b. Data gathering device 32b has been located proximate display device 14b to collect data regarding the demographics and so on of the audience of display device 14b. For example, data gathering device 32b could be a kiosk that provides audience members 16b, 16'b with access to the Internet in exchange for demographic information, which is recorded and maintained in database 18'b, which is then accessible to server computer 20 (See FIG. 1 and accompanying description). Other data gathering devices 32 for gathering demographic information in the vicinity of display device are possible to accomplish a similar purpose. For example, a camera could be used to capture an audience at a given time and process the image to determine demographic make-up of the audience; shopping bags could be dispensed in exchange for demographic information; a free or fee-reduced Automatic Teller Machine could gather demographic data in exchange for reduced fees, and so on. Furthermore, passersby could transfer personal demographic information from cellular telephones, personal digital assistants, and credit cards to database 18'd using cellular communications, radio frequency, infrared communications, and magnetic card readers. The common feature of each data gathering device 32b is that it provides data points about the probable demographic make-up of a viewing audience for a given time and a given location which is accessible to server computer 20.

An interactive data gathering device 32b, such as a kiosk, also provides the viewer with a mechanism to provide immediate feedback. So, for example, a viewer seeing programming content advertising a product or service can immediately access an on-line store to purchase the product or service or to find further information.

INVENTORY OPTIMIZATION EMBODIMENT

The system of the present invention can be applied to reduce inventory build-up at particular locations. By applying the out-of-home network's ability to more precisely target an audience likely to purchase a particular product or service from a particular location efficiencies can be gained that facilitate advertising in a broader market area. Selecting programming content over display devices 14 proximate travel centers wherein travelers are destined for location D could cost-effectively inform a geographically dispersed audience of the inventory in location D. For example, a display device proximate an airport gate having a flight destined for location D could run programming content during times proximate the departure to location D. Thereafter, the programming content on display device 14 would change to reflect that the audience demographics have changed from a demographic associated with location D. In this way, client A would only need to purchase programming time during the specific times when the viewers would likely have a connection with location D.

Figure 5:
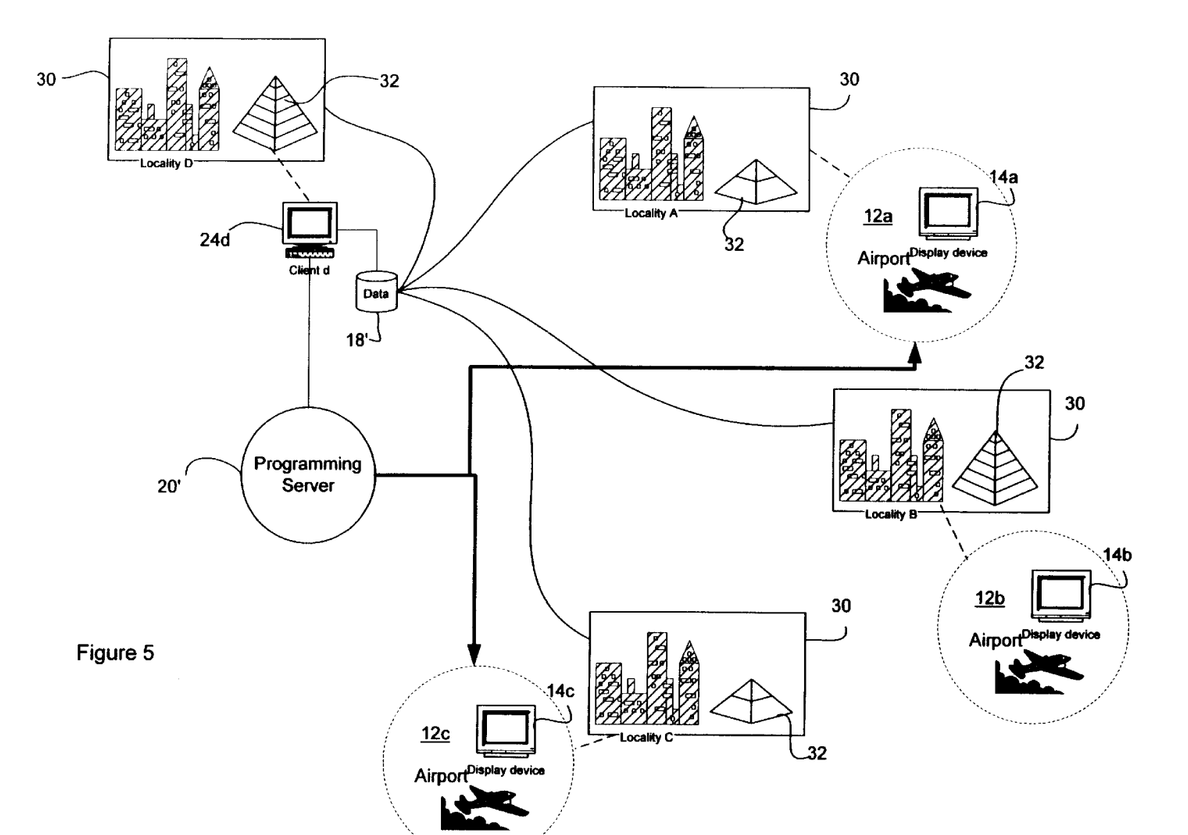
FIG. 5 is an embodiment of the invention wherein the network of display devices is used to smooth geographic inventory spikes.

FIG. 5 further illustrates such an embodiment. Here, client A has inventory of a product in a plurality of disparate locations (i.e., location A, location B, location C, and location D). In this example, client A has excess inventory in location D that it would like to reduce. Conventionally, out-of-home advertising would likely be confined to the market surrounding location D because of the likely return on investment for advertising outside of the market for location D. In other words, it might not be cost effective or likely that client A would purchase advertising in location A and expect that advertising to produce a reduction in the inventory at location D.

Tying the inventory control system of client A to system 20' executing on server 20 produces a select set of advertising locations to reduce the inventory in location D. The system operates by identifying display devices 14 in locations matching locations wherein no excess inventory has built up or for which sales information indicates that the product is selling well, which may include locations other than A, B, C, and D. Furthermore, display devices 14 can be selected wherein the data (e.g., 18'a) indicates that viewers are destined for location D. For example, display devices 14 at airport gates, such as at airports 12a and 12c, proximate flights departing for location D could be selected.

Figure 6:
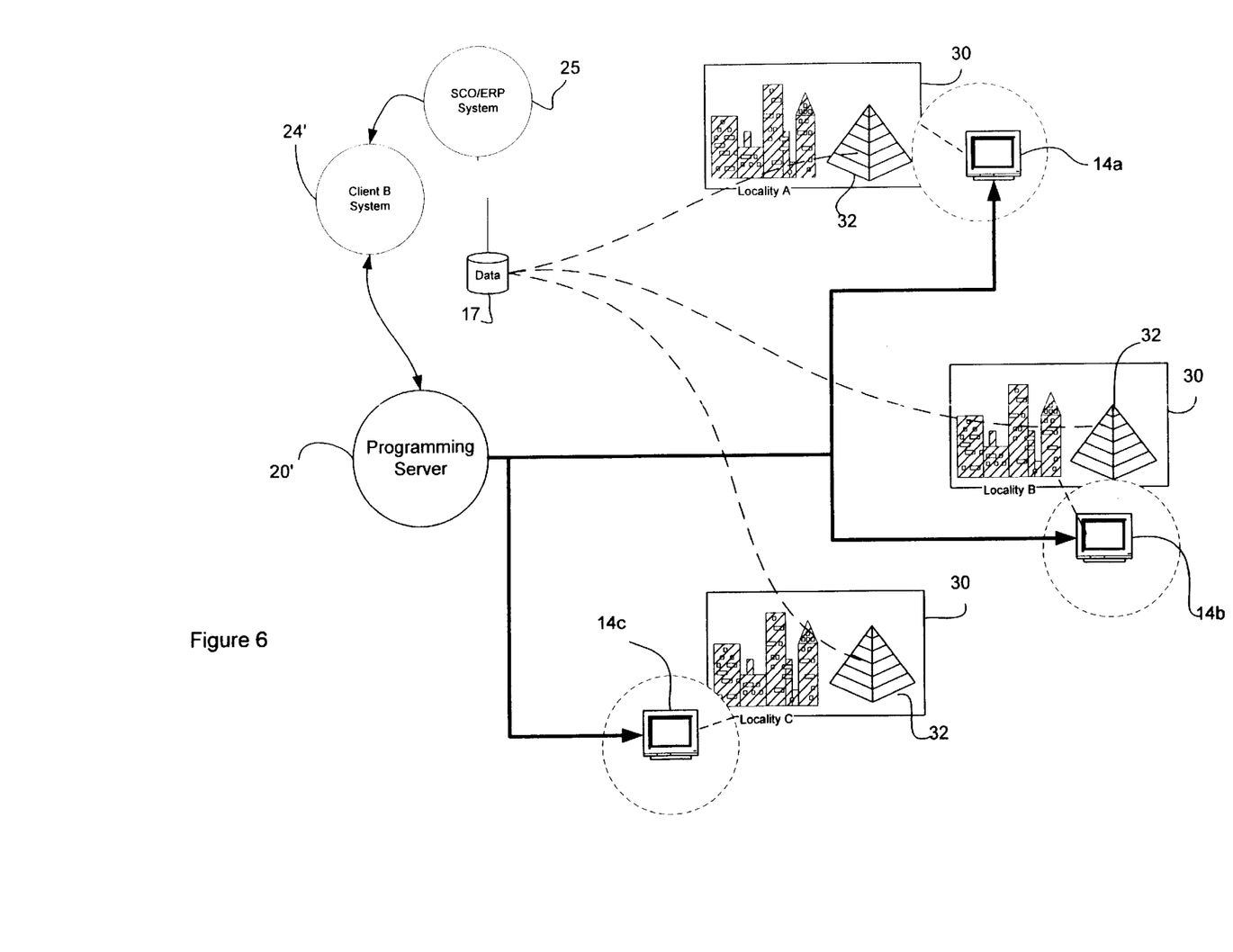
FIG. 6 is a flow chart of an aspect of the invention wherein a user places programming for delivery over the system of the present invention.

FIG. 6 illustrates an alternative embodiment. Here, the programming server 20' is coupled into client B 24' and receives information indicative of inventory of products or services at various ones of client B's locations. Client B may maintain its inventory with a Supply Chain Optimization (SCO) system or Enterprise Resource Planning (ERP) system 25 that maintains a database 17 of inventory tracking information. ERPs are computer applications that handle a wide variety of planning, transaction processing and accounting functions in an integrated manner. Supply Chain Optimization (SCO) systems are a subset of ERP systems that manage data regarding the manufacture and distribution of products. Commonly, SCOs handle master production scheduling (MPS), material requirements planning (MRP), rough cut capacity planning (RCCP), supplier management, inventory racking and finite capacity scheduling (FCS). In this example, the SCO could be from EXE Technologies or Manugistics.

Through this connectivity to client B's inventory, the system 20' identifies that client B has excess inventory of a product in locations A, B, and C that it would like to reduce. These locations may be, for example, retail establishments that sell the products of client B. As in the previous example, system 20' executing on server 20 produces a select set of display devices 14 proximate retail locations A, B, and C. As a result of this inventory to system 20 connection, client B can quickly inform viewers of display devices 14a, 14b, and 14c of the product located in the respective localities when inventory reaches a predefined level. Such a system could, for example, be used to automatically advertise (or recommend advertising) a product, or products, whenever inventory of that product reaches an unsatisfactory level.

Figure 7:
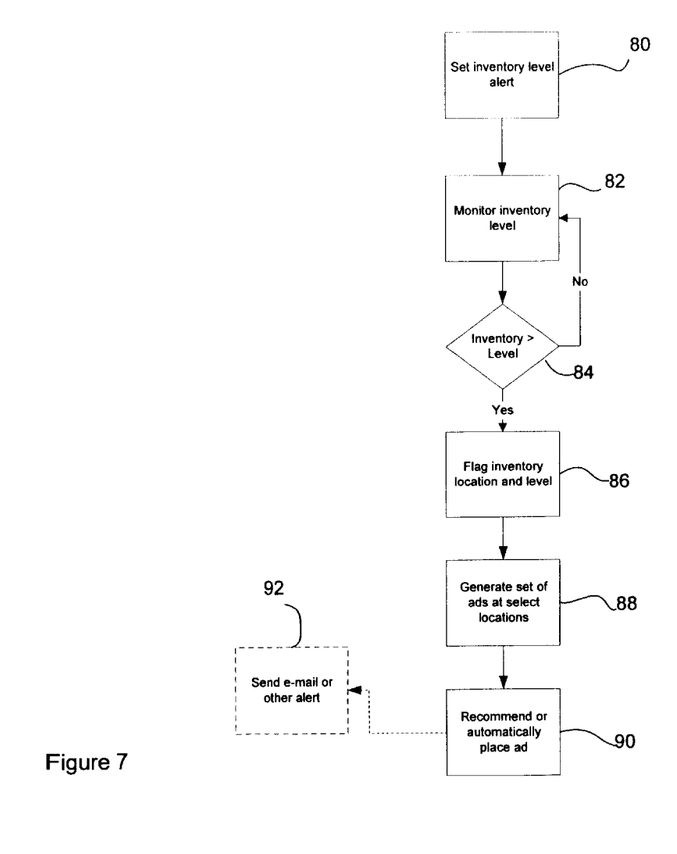
FIG. 7 is a flow chart of the process for advertising of a product whose inventory level at a given location exceeds a limit.

FIG. 7 is a flow chart of the process for advertising or recommending advertising of a product whose inventory level at a given location exceeds a limit. Initially, the predefined inventory limits are set (step 80). These limits can be set for each product at each location (e.g., a particular brand and style of tennis shoe at a particular store), a group of products at a group of locations (all tennis shoes at all stores in Philadelphia), and so on. The system then continuously monitors the inventory against the predefined limit (step 82). If the limit exceeded (step 84), a message is sent from the client 25' to the system 20' indicative of the inventory excess and the location of the excess (step 86). From that information, system 20' generates a set of advertisement locations wherein the product could be advertised (step 88). The system then either automatically places the recommended advertisement (step 90) or send an email or other message indicating the recommended advertisement placement (step 92).

Figure 8:
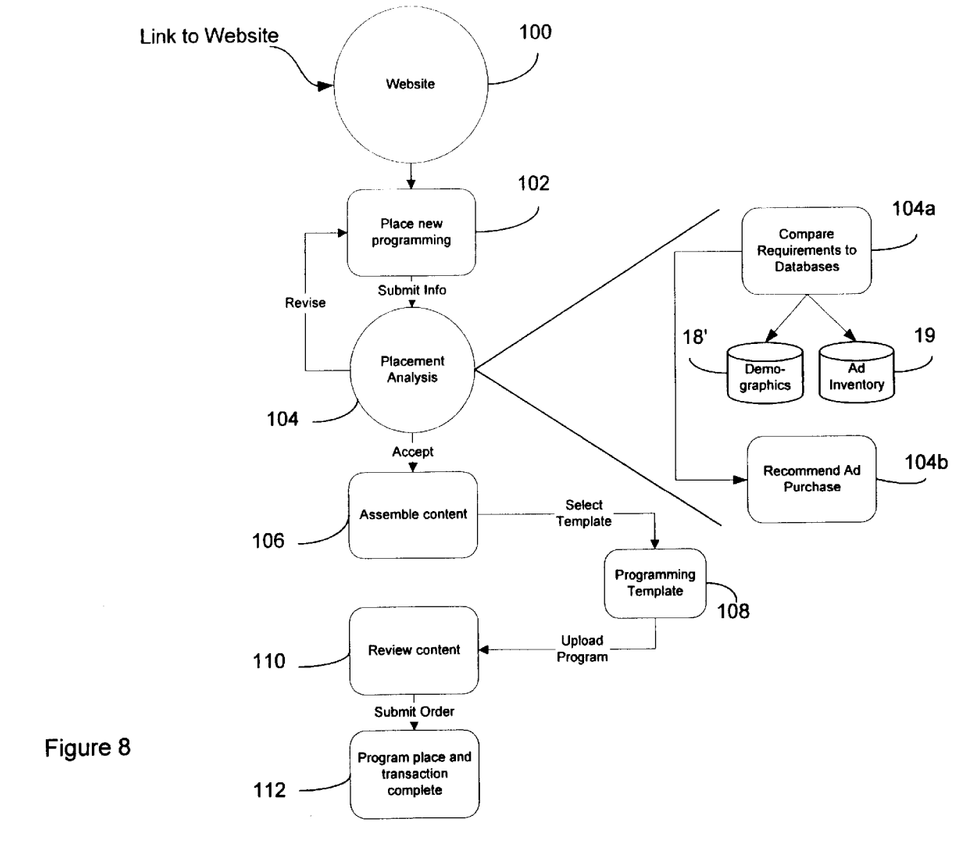
FIG. 8 is a flow chart of a process for placing programming content on a server computer for delivery to selected display devices.

FIG. 8 is a flow chart of a process 20' for placing programming content on server computer 20 for delivery to selected display devices 14. Initially, the process starts by accessing a web site (step 100). From the web site, a client can place new programming content on the network of display devices by filling out a form describing import parameters such as target audience demographics (step 102).

Figure 9:
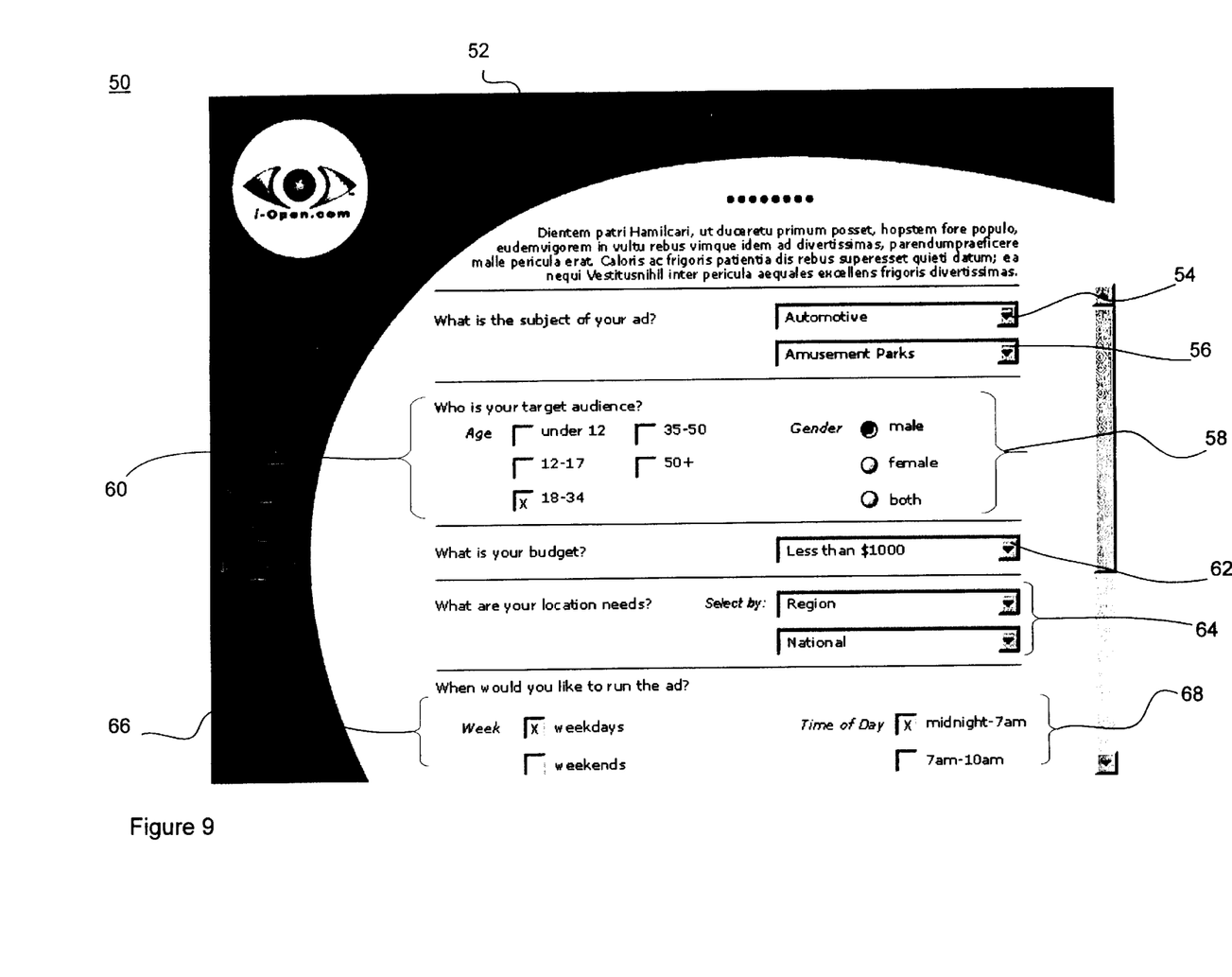
FIG. 9 provides a sample input form.

For example, FIG. 9 provides a sample input form 50. In FIG. 8, the client has selected the option of placing a new ad by selecting button 52. In drop down box 54, the client selects the subject of the programming (here an ad) and the preferred venues in drop down box 56. In this example, the client has selected automobiles as the subject matter and amusement parks as the preferred venue category. The client selects the demographic (e.g., age and sex) of the target audience with buttons 58 and 60. The example form 50, also shows an input for budget 62, region for display (e.g., select regions or countries) 64, and time and day of week 68, 66, respectively.

Returning to the flow chart of FIG. 8, next, (step 104) the system will search databases 18, 18', etc, to determine appropriate display devices based on the criteria entered in the previous step. The system compares the requirements input by the client to the available demographics of particular display devices (e.g., in database 18') and available display device time slot inventory (e.g., database 19) (step 104a). A recommendation of display devices for display of programming is then recommended (step 104b).

The cost and selection of the programming distribution will be displayed so that the client will have a chance to revise or accept the programming distribution placement. If the client accepts the programming distribution placement, the client next assembles the programming content (step 106). Preferably, templates are provided to step the client through the content assembly process (step 108). The templates preferably provide various programming layout alternatives including full motion video, still frame, text, and so on, wherein the client can insert the appropriate material or develop it on-line. After the content is assembled, the client has the opportunity to review the content (step 110). After the client is satisfied with the content, an order is submitted and the programming is placed on the network of display devices (step 112).

CONCLUSION

In sum, the present invention provides a system and process for Dynamic place based out-of-home programming, optimizing out-of-home advertising based on collecting and maintaining demographic information for programming display venues, and optimizing inventory distribution through pin point targeted out-of-home advertising. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of network systems applications, including Internet, cable based, and hybrid Internet-cable systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Aspects of each program are preferably implemented in a high level scripting, procedural, or object oriented programming language to communicate with a computer system. However, aspects of the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Accordingly, reference should be made to the appended claims as indicating the scope of the invention.

What is claimed is:

1. A programming distribution network, comprising:
   (a) a server computer;
   (b) a plurality of geographically dispersed display devices, wherein the display devices are situated in public places; and
   (c) a communications network interconnecting the server computer with the respective display devices;
   wherein the server is programmable to select a specific one of the plurality of geographically dispersed display devices and deliver thereto programming for display on that display device; and
   (d) a data gathering device that is co-located adjacent to at least one of the display devices and interconnected with the server via the communications network, whereby at least one of the viewers of the programming displayed on the at least one display device provides information to the programming distribution network.

2. A programming distribution network as recited in claim 1, wherein the data gathering device is a kiosk that is configured to provide Internet access to the users.

3. A programming distribution network as recited in claim 1, wherein at least one display device comprises a large flat screen display.

4. A programming distribution network as recited in claim 3, wherein the large flat screen display comprises a plasma display.

5. A programming distribution network as recited in claim 1, wherein the programming displayed on the respective display devices comprises full motion video.

6. A programming distribution network as recited in claim 5, wherein the full motion video comprises one of AVI and MPEG.

7. A programming distribution network as recited in claim 1, wherein the server is programmed to select the site-specific programming for display on the respective display device based on demographic information.

8. A programming distribution network as recited in claim 7, wherein some of the demographic information is collected through one or more kiosks collocated with one or more of the display devices.

9. A programming distribution network as recited in claim 7, wherein the demographic information includes information indicative of at least one of age, sex, income, destination, and interests for a plurality of viewers.

10. A programming distribution network as recited in claim 9, wherein the demographic information is provided by a database comprising site-specific demographic information collected from a secondary source.

11. A programming distribution network as recited in claim 10, wherein the secondary source comprises a reservation system.

12. A programming distribution network as recited in claim 11, wherein the reservation system comprises a travel reservation system.

13. A programming distribution network as recited in claim 12, wherein the travel reservation system comprises one of an airline reservation system, a train reservation system, a rental car reservation system, and a hotel reservation system.

14. A programming distribution network as recited in claim 1, wherein at least one of the public places is selected from a group comprising: an airport, a train station, a shopping center.

15. A programming distribution network as recited in claim 1, wherein the programming information comprises advertising.

16. A programming distribution network as recited in claim 1, wherein the programming comprises one of still pictures and text.

17. A method for distributing programming, comprising the acts of:

provdiing in a public place an individually addressable display device coupled to a computer network;

receiving programming information at the individually addressable display device wherein the programming information is pushed to the individually addressable display device over the computer network; and collocating a data gathering device with the individually addressable display device, said data gathering device coupled to the computer network, whereby at least one viewer of the programming displayed on the at least one display device provides information to the computer network.

18. A method for distributing programming as recited in claim 17, wherein the programming information pushed to the individually addressable display device is based on demographic information.

19. A method for distributing programming information as recited in claim 17, wherein the individually addressable display device is addressable by way of the Internet.

20. A method for distributing programming information as recited in claim 19, wherein the computer network comprises a virtual private network.

21. A method for distributing programming as recited in claim 17, wherein the programming comprises advertising.

22. A method for dstributing programming as recited in claim 17, wherein the public place comprise a transportation center.

23. A method for distributing programming as recited in claim 22 wherein the transportation center comprises an airport.

24. A method for distributing programming as recited in claim 22 wherein the transportation center comprises a train station.

25. A method for distributing programming as recited in claim 17 wherein the data gathering device comprises a keyboard.

26. A method for distributing programming as recited in claim 17 wherein the data device comprises an Internet access device.

27. A method for distributing programming as recited in claim 26 wherein a user may access an on-line store.

28. A computer-readable medium bearing computer-readable instructions for carrying out the steps recited in claim 17.

29. A method for distributing programming, comprising:

delivering programming information to an individually addressable display device in a public place wherein the programming information is pushed to the individually addressable display device over a computer network, said individually addressable display device being co-located with a data gathering device, said data gathering device coupled to the computer network, whereby at least one viewer of the programming displayed on the at least one display device may provide information to the computer network.

30. The method for distributing programming as recited in claim 29 wherein the programming information comprises an advertisement for a good.

31. The method for distributing programming as recited in claim 29 wherein the programming information comprises an advertisement for a service.

32. The method for distributing programming as recited in claim 29 wherein the programming information comprises full motion video.

33. The method for distributing programming as recited in claim 29 wherein the data gathering device comprises an interactive data gathering device.

34. The method for distributing programming as recited in claim 33 wherein the data gathering device comprises a keyboard.

35. The method for distributing programming as recited in claim 34 wherein the data gathering device comprises a mechanism for accessing an on-line store over an Internet for purchasing a good advertised on the individually addressable display device.

36. The method for distributing programming as recited in claim 34 wherein the data gathering device comprises a mechanism for accessing an on-line store over an Internet for purchasing a service advertised on the individually addressable display device.

\* \* \* \* \*